United States Patent [19]
Ohnishi

[11] 4,284,115
[45] Aug. 18, 1981

[54] TIRE TREAD

[75] Inventor: Shumio Ohnishi, Takatsuki, Japan

[73] Assignee: The Toyo Rubber Industry Co., Ltd., Osaka, Japan

[21] Appl. No.: 67,235

[22] Filed: Aug. 16, 1979

[30] Foreign Application Priority Data

Aug. 17, 1978 [JP] Japan ............................. 53-100539
Aug. 17, 1978 [JP] Japan ............................. 53-100540

[51] Int. Cl.³ .......................................... B60C 11/00
[52] U.S. Cl. .............................. 152/209 R; 152/209 B
[58] Field of Search ........... 152/209 R, 209 A, 209 B, 152/209 D, 209 WT

[56] References Cited
U.S. PATENT DOCUMENTS

| | | | |
|---|---|---|---|
| 2,756,797 | 8/1956 | Campbell | 152/209 R |
| 3,055,410 | 9/1962 | Caulkins | 152/209 R |
| 3,664,402 | 5/1972 | Montagne | 152/209 R |
| 3,674,076 | 8/1972 | Dailey, Jr. | 152/209 R |
| 4,177,850 | 12/1979 | Ogawa et al. | 152/209 R |

*Primary Examiner*—Michael W. Ball
*Attorney, Agent, or Firm*—Wenderoth, Lind & Ponack

[57] ABSTRACT

A relatively high speed and heavy duty bias tire for use in trucks, buses, construction vehicles and the like. In case $\beta > \gamma$ wherein $\beta$ is the slant angle of the face of the groove walls on the center line side and $\gamma$ is the slant angle of the face of groove walls on the shoulder line side, $\beta = 5°$ to $45°$, $\beta - \gamma = 1°$ to $16°$ and $\beta/\gamma = 1.10$ to $2.00$. In case $\beta = \gamma$, then the radius $R_1$ of curvature between the bottom of the groove walls and the center line side face and the radius $R_2$ of curvature between the bottom of the groove walls and the shoulder line side face are in the relationships $R_1 > R_2$ and $R_1/R_2 = 1.10$ to $2.00$.

6 Claims, 17 Drawing Figures

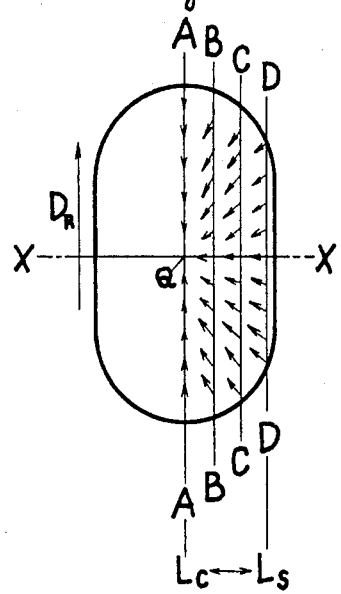
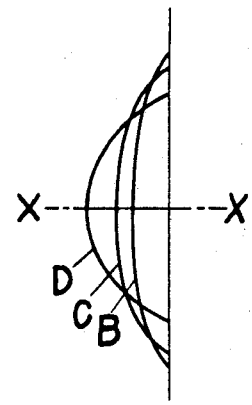
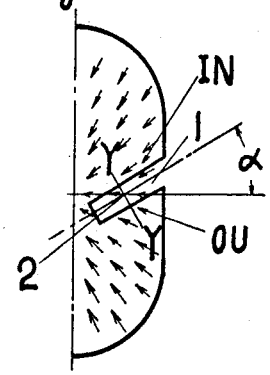
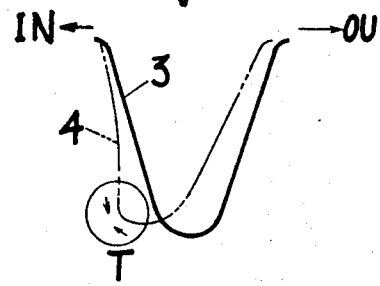

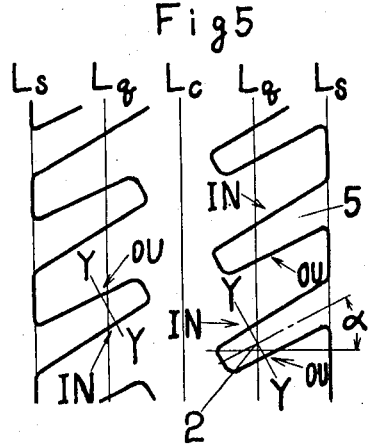
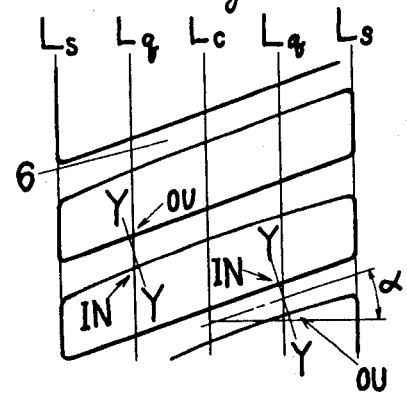
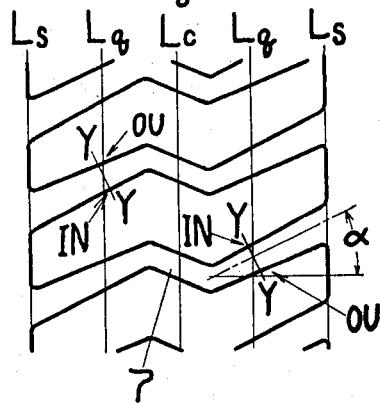
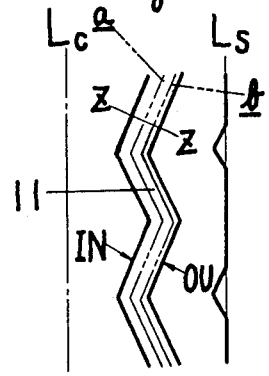

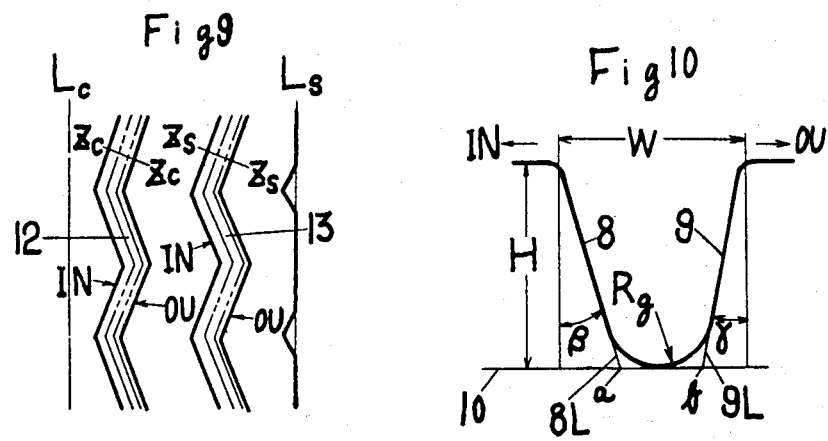
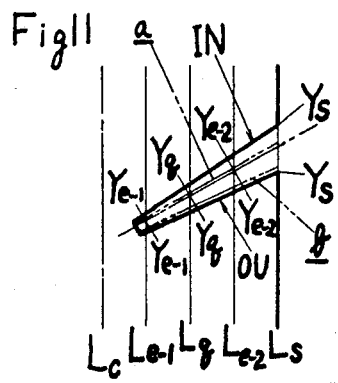

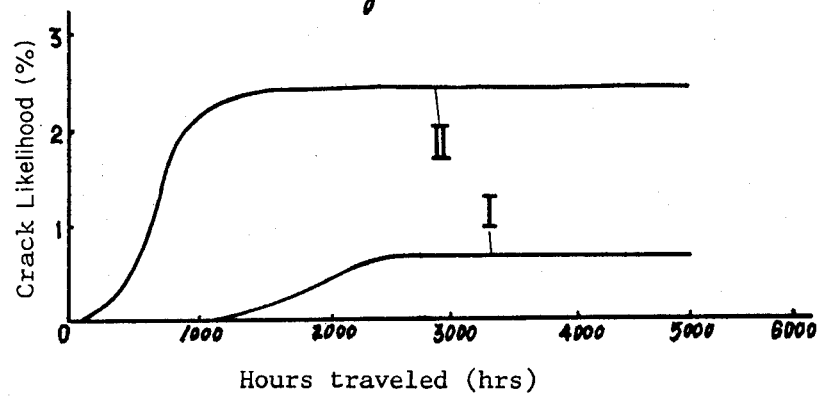
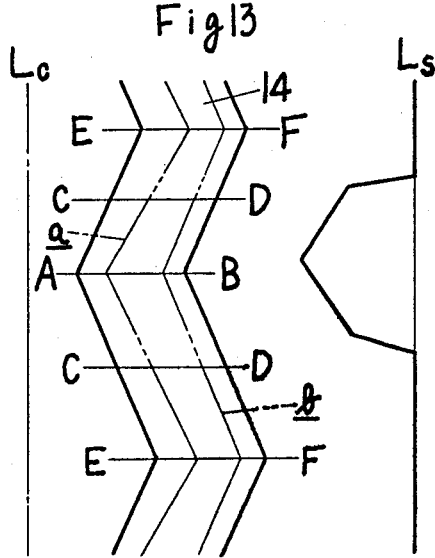
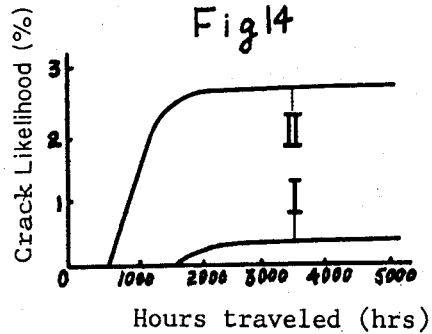

TIRE TREAD

BACKGROUND OF THE INVENTION

1. Field of the Invention

This invention relates to a pneumatic tire and more particularly to a relatively high speed and heavy duty bias tire for use in trucks, buses, construction vehicles and the like, wherein the form of grooves forming the tread pattern is improved and thereby the probability of cracks in the bottoms of the grooves is reduced to a minimum and an extended durability and a higher degree of safety are assured.

2. Prior Art

Tread patterns such as rib type, lug type, etc. have important effects on tire performances such as rolling resistance, steering property, stability, tractive ability, braking power and so forth. Accordingly, various studies have been directed to the tread pattern itself so as to improve those performances successfully.

On the other hand, it is often seen that cracks occur in the bottoms of the grooves in the tread pattern of relatively high speed and heavy duty tires for use in trucks, buses, and construction vehicles and more particularly sand conveying tires, which results in the inability to travel. Heretofore, the problems were coped with by merely changing the composition of the rubber without tracing the reasons for the cracks, and it cannot be said that a truly satisfactory countermeasure has been offered.

SUMMARY OF THE INVENTION

The inventor's analysis of the reasons why cracks occur in the bottoms of grooves in the tread pattern revealed that the occurence of those cracks is greatly dependent upon the groove configuration and more particularly the slant angle of the groove walls and the curvature of the grooves between the walls and the bottom thereof.

Accordingly, it is an object of the present invention to prevent occurence of cracks in the bottoms of grooves by setting the slanting angle of groove walls and the curvature of the grooves between the walls and the bottom thereof within a specific range, in the tread pattern of a relatively high speed and heavy duty bias tire for use in trucks, buses, construction vehicles and the like.

The above specified object and feature of the present invention will become more clear from the following description with reference to the accompanying drawings.

BRIEF DESCRIPTION OF THE DRAWING

FIG. 1 is a schematic representation of stress upon the tread rubber when a tire makes contact with the ground;

FIG. 2 is a schematic representation of tangential stress on the line X—X of FIG. 1;

FIG. 3 is a schematic representation of the action of tangential stress in a lug type groove;

FIG. 4 is a cross sectional view along the line Y—Y of FIG. 3 showing the deformation of a groove due to tangential stress;

FIGS. 5 through 7 are schematic plan views of lug type tread patterns;

FIGS. 8 and 9 are schematic plan views of rib type tread patterns;

FIGS. 10 through 14 are explanatory diagrams of a tire according to the present invention and in which $\beta > \gamma$ wherein $\beta$ is the slant angle of the wall face on the centerline side of the groove and $\gamma$ is the slant angle of the groove wall face on the shoulder line side of the groove; wherein FIG. 10 is an example of the shape of a transverse cross section of a groove;

FIG. 11 is a partially plan view showing a slanting condition in the longitudinal direction of a groove and its relation to a tread position along its width in an example of a lug type groove;

FIG. 12 is a graph showing the likelihood of formation of cracks in a lug type pneumatic tire according to the present invention and a prior art tire in actual driving tests;

FIG. 13 is a schematic plan view of another example of a rib type tread groove;

FIG. 14 is a graph showing the likelihood of formation of cracks in a rib type pneumatic tire according to the present invention and a prior art tire in actual driving tests;

FIGS. 15 through 17 are explanatory diagrams of a tire according to the present invention and in which $\beta = \gamma$; wherein FIG. 15 is an example of the shape of a transverse cross section of a groove;

FIG. 16 is a partially plan view showing a slanting condition in the longitudinal direction of a groove and its relation to a tread position along its width in an example of a lug type groove; and FIG. 17 is a graph showing the likelihood of formation of cracks in the lug type pneumatic tire according to the present invention and a prior art tire in actual driving tests.

DETAILED DESCRIPTION OF THE INVENTION

Figure 15:
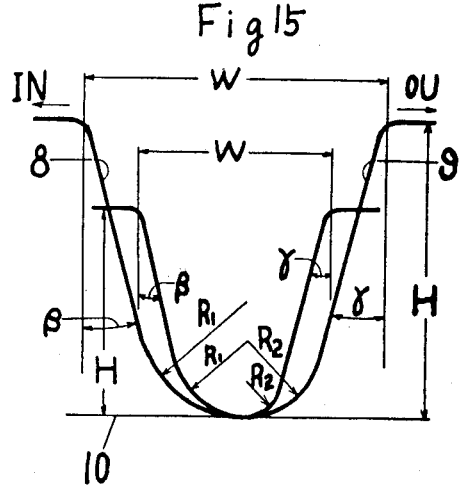

FIG. 1 illustrates the direction of stress upon the tread rubber when a tire is in contact with the ground, wherein Q is the center of the contact area, X—X line is a straight line across the center Q parallel to the axis of rotation of the tire, A—A, B—B, C—C and D—D are the split lines where the stress is measured, center line Lc corresponds to the center plane of the tire, shoulder line Ls corresponds to the shoulder plane and Dr is the direction of rotation of the tire. Each of the arrows in the drawing indicates the stress direction.

FIG. 2 illustrates tangential stresses at three points along line X—X when the tire is in contact with the ground, B, C and D indicating the tangential stresses along the split lines B—B, C—C and D—D respectively in FIG. 1.

While those tangential stresses are determined by the radius of curvature of the crown of the tire and the load, they increase progressively from the center line Lc to the shoulder line Ls. This is almost the same in all tires.

FIGS. 3 and 4 depict the tangential stresses on a prior art symmetric groove of the lug type and deformation of the groove caused thereby, wherein the numeral 1 is a groove having a backward angle α°, IN is the face of the groove walls on the center line side, OU is the face of the groove walls on the shoulder line side and 2 is a point spaced from the center line one quarter of the width of the tire. The cross section of the groove along the bottom of the groove and the center line side face IN is greatly bent and subject to compression force. Subsequently, as that portion of the tire moves away from the ground and reaches right above the ground, the compression force is reduced and the groove bottom undergoes tensile stress. While said operation is repeated, the rubber at the deformed portion T gradually becomes fatigued and cracked. This eventually leads to the generation of large cracks. Although in the prior art, tires having grooves with a backward angle $\alpha°$ have been constructed to maximize characteristics such as pulling power, steering property and irregular wear resistance, no attention has been paid to the relationship between the generation of cracks and the groove configuration. Only an attempt has been made to change the rubber compound to eliminate the possibility of those cracks, but it was not satisfactory.

The present invention seeks to prevent completely the occurence of the cracks by employing a particular asymmetric groove configuration which has been developed as a consequence of intensive investigation into the correlation between the occurrence of the cracks and the groove configuration.

FIGS. 5 through 9 show various basic patterns of a tire, wherein cracks also occur at the groove bottom. While those patterns are in actual practice more complicated, they are schematically illustrated for explanation and convenience.

In the lug type tread patterns shown in FIGS. 5 through 7, the line Y—Y indicates a cross section line the grooves at one quarter of the tread width. IN indicates the face toward the center line side and OU indicates the face toward the shoulder line side. The numerals 5, 6 and 7 indicate a respective grooves with the backward angle $\alpha°$.

Referring to FIGS. 8 and 9, there is illustrated tires having rib type patterns. In FIG. 8, a single groove 11 is formed between the center line portion Lc and the shoulder line portion Ls of the tire, the line Z—Z indicating a transverse cross section line across the groove and said cross section being denoted Z. IN indicates the face on the center line side and OU indicates the face on the shoulder line side.

FIG. 9 shows a tire having two grooves 12 and 13 formed between the center line portion Lc and the shoulder line portion Ls, wherein respective cross sections Zc and Zs are taken along the lines Zc—Zc and Zs—Zs respectively.

FIG. 10 shows a transverse cross section of the groove wherein H is the depth of the groove, W is the width of the groove and H/W is the aspect ratio of the grooves. $\beta$ is the slant angle of the groove wall 8, namely, the angle between the face IN of the groove wall on the center line and a line parallel to the central longitudinal plane of the groove and is selected so as to be within the range of 5°–45° depending on the tread pattern. On the other hand, $\gamma$ is the slant angle of the groove wall 9, namely, the angle between the face OU on the shoulder line side and a line parallel to the central longitudinal plane of the groove. According to the present invention, under the condition where $\beta > \gamma$, the value of $\beta - \gamma$ is within the range of 1° to 16° and the ratio of $\beta/\gamma$ is within the range of 1.10 to 2.00.

For lug type tread patterns, a ratio $\beta/\gamma$ is preferably selected to be within the range of 1.10 to 2.00 so as to be a maximum at the shoulder line portion Ls and gradually decrease toward the center line portion Lc. In other words, the grooves are more or less twisted along their length such that $\beta$ increases in the direction toward the shoulder line portion and decreases in the direction toward the center line portion whereas $\gamma$ is a minimum at the shoulder line portion Ls and increases in the direction toward the center line portion. In the drawings, the reference (a) represents the intersection of the cross section line 8L which is an extension of the groove wall 8 on the center line side with the groove bottom level line 10 and the reference (b) is the intersection of the cross section line 9L which is an extension of the groove wall 9 on the shoulder line side with the groove bottom line 10. Rg represents the radius of curvature of the groove bottom and normally Rg/(H/W) is 4 to 20 for narrower tires and 5 to 30 for wider tires.

FIG. 11 is an example of the twisted condition of the groove along its length, wherein Yq is a cross section taken along the line Yq—Yq at the ¼ tire width position Lq. The face located toward the center line portion Lc along the line Yq—Yq is denoted as the center line side face and the face toward the shoulder line portion Ls is denoted as the shoulder line side face. A cross section Ye-1 is taken along the line Ye-1—Ye-1 at the ⅛ tire width position Le-1 near the center line portion Lc. A cross section Ye-2 is taken along the line Ye-2—Ye-2 at the ⅛ tire width position Le-2 near the shoulder line portion Ls. A cross section Ys is taken along the line Ys—Ys at the shoulder line portion Ls. The two-dot chain lines (a) and (b) are elongated lines through the points of intersection (a) of the groove wall line on the center line side and the points of intersection (b) of the groove wall line on the shoulder line side, respectively. In this manner, the slant angle of the groove walls is preferably changed in the longitudinal direction of the groove.

As with the lug type grooves, the rib type grooves 11, 12 and 13 shown in FIGS. 8 and 9 are shaped according to the conditions $\beta - \gamma : 1°$ to 16° and $\beta/\gamma : 1.1$ to 2.0 in $\beta > \gamma$.

It should be understood from the two-dot chain lines that the lines through the points of intersection (a) for the groove wall lines on the center line side and the points of intersection (b) for the groove wall lines on the shoulder line side are not at an angle to the direction of the length of the groove. In the case where four grooves are formed within the full tread width as indicated in FIG. 9, the cross section Zc near the shoulder line portion Ls may be such that the slant angle $\beta$ of the face IN of the groove wall on the center line side in the cross section Zs is greater than in the cross section Zc. Moreover, as indicated in FIG. 13, the slant angle can be changed in the direction of the length of the rib type tread grooves. That is to say, the slant section angle $\beta$ can be different at the lines A–B, C–D and E–F, respectively.

The following sets forth groove configurations of sample tires manufactured under the conditions $\beta > \gamma$, $\beta - \gamma : 1°$ to 16° and $\beta/\gamma : 1.10$ to 2.00 according to the present invention together with the results of actual running tests thereof.

The groove configurations are listed in Tables 1 and 2 and the results of the actual running tests are depicted in FIG. 12 for the lug type tire and FIG. 14 for the rib type tire.

In Table 1, the angle $\beta$ of the lug type tire increases in the direction toward the shoulder line portion Ls, while the angle $\gamma$ is a minimum at the shoulder line portion Ls and increases gradually toward the center line portion Lc, but in the example the angle $\gamma$ is the same at three portions. Although modified according to the tread pattern, the angle $\gamma$ generally increases in the direction toward the center line portion Lc.

TABLE 1

| Tire type | | Position | | |
|---|---|---|---|---|
| | Ye−1 | Yq | Ye−2 | Ys |
| Lug type | β/δ | β/δ | β/δ | β/δ |
| 33.25-35 | 26°/22° = 1.18 | 30°/22° = 1.30 | 33°/22° = 1.5 | 36°/20° = 1.8 |
| 32 PR | | | | |
| Rib type | | | | β/δ |
| 16.00-25 | | | | 15°/8° = 1.9 |

TABLE 2

| Tire type | Cross section | β | | Radius of groove bottom | δ | |
|---|---|---|---|---|---|---|
| Rib type | A - B | Angle Side A | 30° | 12 mm | Angle Side B | 25° |
| 24.00-35 | C - D | Angle Side C | 32.5° | 18 mm | Angle Side D | 25° |
| 36 PR | E - F | Angle Side E | 35° | 22 mm | Angle Side F | 25° |

When the actual running tests were conducted on the sample tires having the relationships between the angles β and γ as shown in the above tables according to the present invention, there was no appreciable deformation of the groove bottoms under the load condition, and the groove bottoms remained smooth and free of wrinkles or cracks due to the growth of wrinkles.

The results of the actual running tests are plotted in FIGS. 12 and 14 wherein the numbers on the abscissa indicate hours traveled hr and the numbers on the ordinate indicate cumulative likelihood of the groove cracks. The cumulative crack likelihoods used herein mean a ratio of the number of cracked tires to the total number tires employed in the actual running tests after the passage of a specific length of time. Comparison between the crack likelihood curve I of the tires with a tread pattern according to the present invention and the crack likelihood curve II of the prior art tires proves that the present invention is very successful in preventing the occurrence of cracks.

In the foregoing description, there has been investigated the preferred relationship between β and γ for the case where β>γ. Further investigation into other factors for reducing the occurrence of the cracks for the case where β=γ has revealed that an attempt to set the radius $R_1$ of curvature between the groove bottom and the face IN on the center line side and the radius $R_2$ of curvature between the groove bottom and the face OU one the shoulder line side within a specific range is successful in preventing the occurrence of the cracks.

Hereinafter, the description will be directed to this point. FIG. 15 is a transverse cross sectional view, corresponding to FIG. 10, showing different conditions of the width of the groove by two solid lines, and wherein the references are the same as those described before, namely, H is the depth of the groove, W is the width of the groove, β is the slant angle of the groove wall 8, namely, the slant angle of the face IN on the center line side. 10 is the groove bottom line, and γ is the slant angle of the groove wall 9, namely, slant section angle of the face OU at the shoulder line side.

Another feature of the present invention is that, in the case where β=γ, the relationship of the radius $R_1$ of curvature between the groove bottom and the face IN on the center line side and the radius $R_2$ of curvature between the groove bottom and the face OU on the shoulder line side is $R_1 > R_2$ and ratio of $R_1/R_2$ is selected to be within the range 1.10 to 2.00.

Figure 16:
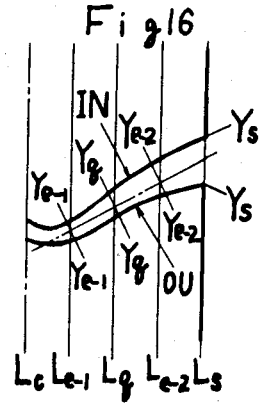

FIG. 16 is an example of a lug type tread groove, wherein Lc is the center line portion of the tread width, Ls is the shoulder line portion, Yq—Yq is a cross section line at the ¼ position Lq of the tread width. The face located toward the center line portion Lc along the line Yq—Yq is denoted as the center line side face IN and the face toward the shoulder line portion Ls is denoted as the shoulder line side face OU. A cross section Ye-1 is taken along the line Ye-1—Ye-1 at the ⅛ tire width position Le-1 near the center line portion Lc. A cross section Ye-2 is taken along the line Ye-2—Ye-2 at the ⅛ tire width position Le-2 near the shoulder line portion Ls. A cross section Ys is taken along the line Ys—Ys at the shoulder line portion Ls. Preferably, the depth H and the width W of the lug type tread grooves are increased gradually from the center line portion Lc to the shoulder line portion Ls. In this case, the radii $R_1$ and $R_2$ of the curvature between the side faces and the groove bottom are decreased progressively in the direction toward the center line portion Lc and increased progressively in the direction toward the shoulder line portion Ls.

In the rib type tread grooves, as shown in FIGS. 8 and 9, the width and depth of the groove are not varied in the circumferential direction.

In the case where four rib type tread grooves are formed within the tread width as shown in FIG. 9, the ratio of the radii $R_1$ and $R_2$ of the curvatures between the side faces and the groove bottoms near the shoulder line portion may be greater than the ratio, $R_1/R_2$ of the curvatures near the center line portion.

Figure 17:
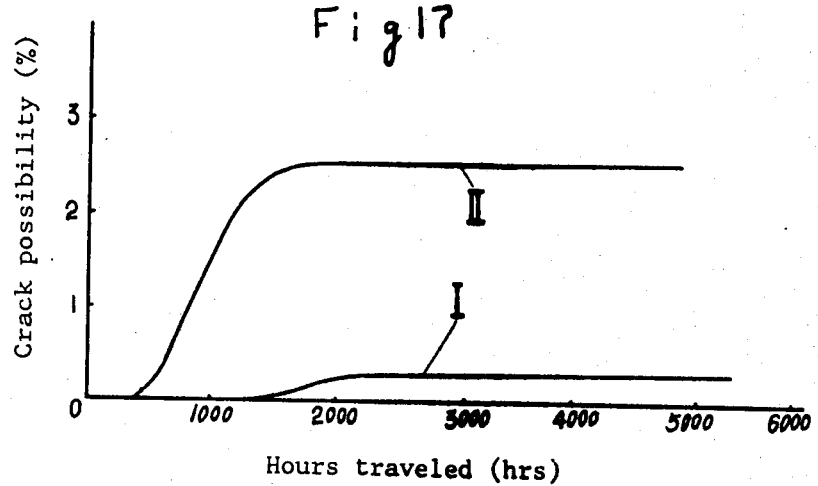

The construction of the grooves of sample tires manufactured under the conditions β=γ, $R_1/R_2$: and 1.10 to 2.00 are described below together with the results of actual running tests. The groove configurations are as shown in Table 3 and the results of the actual running tests are depicted in FIG. 17 in the same manner as in FIGS. 12 and 14.

TABLE 3

| Tire type | Position in tread width | Center line side face IN β (o) | Center line side face IN $R_1$ (mm) | Shoulder line side face OU δ (0) | Shoulder line side face OU $R_2$ (mm) |
|---|---|---|---|---|---|
| Lug type | Le−1 | 15° | 11 | 15° | 9, $R_1/R_2 = 1.22$ |
| 24.00-49 | Lq | 17° | 15 | 17° | 10, $R_1/R_2 = 1.50$ |
| 36 PR | Le−2 | 18° | 18 | 18° | 11, $R_1/R_2 = 1.64$ |
| | Ls | 20° | 22 | 20° | 12, $R_1/R_2 = 1.83$ |

When the actual running tests were conducted on the sample tires having the relationships $R_1 > R_2$ and $R_1/R_2$: 1.10 to 2.00 for the radii $R_1$ and $R_2$ of curvature in the case where β=γ, there was no appreciable deformation in the groove bottoms under the load condition, and the groove bottoms remained smooth and free of wrinkles or cracks due to the growth of wrinkles. As is apparent from the comparison of the results of the actual running tests in FIG. 17 between the crack likelihood curve I of the tires according to the above described relationships according to the present invention and the crack likelihood curve II of the prior art tires, the occurrence of cracks can be effectively reduced according to the present invention.

What is claimed is:

1. A pneumatic bias tire for relatively high speed and heavy duty vehicles, comprising: a lug type tread pattern having a plurality of laterally extending grooves having a backward angle $\alpha°$, the slant angle $\beta$ of the groove wall toward the tire center line portion of the tire selected within a range of 5° to 45° and increasing in the direction toward the shoulder line portion of the tire so as to reach a maximum angle at the shoulder line portion and being related to the slant angle $\gamma$ of the groove wall face positioned toward the shoulder line portion according to the relationships:

$\beta > \gamma$,
$\beta - \gamma = 1°$ to 16°,
and $\beta/\gamma = 1.10$ to 2.00.

2. A pneumatic bias tire for relatively high speed and heavy duty vehicles; comprising: a rib type tread pattern having a plurality of circumferentially extending grooves with a slant angle $\beta$ of the groove wall face positioned toward the tire center line portion being within a range of 5° to 45° and being related to the slant angle $\gamma$ of the groove wall face positioned toward the shoulder line portion of the tire according to the relationships:

$\beta > \gamma$,
$\beta - \gamma = 1°$ to 16°,
and $\beta/\gamma = 1.10$ to 2.00.

3. A pneumatic bias tire according to claim 2 wherein the grooves have zig-zag portions extending in the direction of the circumference of the tire, and the slant angle $\beta$ of the groove wall face toward the center line portion decreases between groove corners as said groove wall toward the center line portion extends from the corners of the zig-zag groove near the shoulder line portion to the corners near the center line portion.

4. A pneumatic bias tire according to claim 2 wherein there are four circumferentially extending grooves and the slant angle $\beta$ in the outer two grooves positioned near the shoulder line portions is greater than the slant angle $\beta$ in the inner two grooves positioned near the center line portion.

5. A pneumatic bias tire for relatively high speed and heavy duty vehicles, comprising: a lug type tread pattern having a plurality of laterally extending grooves having a backward angle $\alpha°$ and having a depth and width increasing toward the shoulder line portion of the tire, the slant angle $\beta$ of the groove wall positioned near the center line portion of the tire is within the range of 5° to 45° and increases in the direction toward the shoulder line portion of the tire so as to reach a maximum angle at the shoulder line portion and being related to the slant angle $\gamma$ of the groove wall positioned toward the shoulder line portion according to the relationship $\beta = \gamma$, and the radius $R_1$ of the curvature between the groove bottom and the groove wall toward the center line portion and the radius $R_2$ of the curvature between the groove bottom and the groove wall toward the shoulder line portion being in relationship $R_1 > R_2$ and $R_1/R_2$ being in the range 1.10 to 2.00.

6. A pneumatic bias tire for relatively high speed and heavy duty vehicles, comprising: a rib type tread pattern having a plurality of circumferentially extending grooves having a constant depth and width in the circumferential direction, the slant angle $\beta$ of the groove wall face positioned toward the center line portion of the tire being within a range of 5° to 45° and being related to the slant angle $\gamma$ of the groove wall positioned toward the shoulder line portion of the tire in the relationship $\beta = \gamma$, and the radius $R_1$ of the curvature between the groove bottom and the groove wall toward the center line portion and the radius $R_2$ of the curvature between the groove bottom and the groove wall toward the shoulder line portion is $R_1 > R_2$ and $R_1/R_2$ is in the range of 1.10 to 2.00.

* * * * *